(No Model.) 3 Sheets—Sheet 1.

J. KAYLOR.
HAY TEDDER.

No. 496,612. Patented May 2, 1893.

ATTEST.
Helen Graham
William Graham

INVENTOR.
JOHN KAYLOR,
by his attorney.
L. P. Graham

THE NORRIS PETERS CO., PHOTO-LITHO., WASHINGTON, D. C.

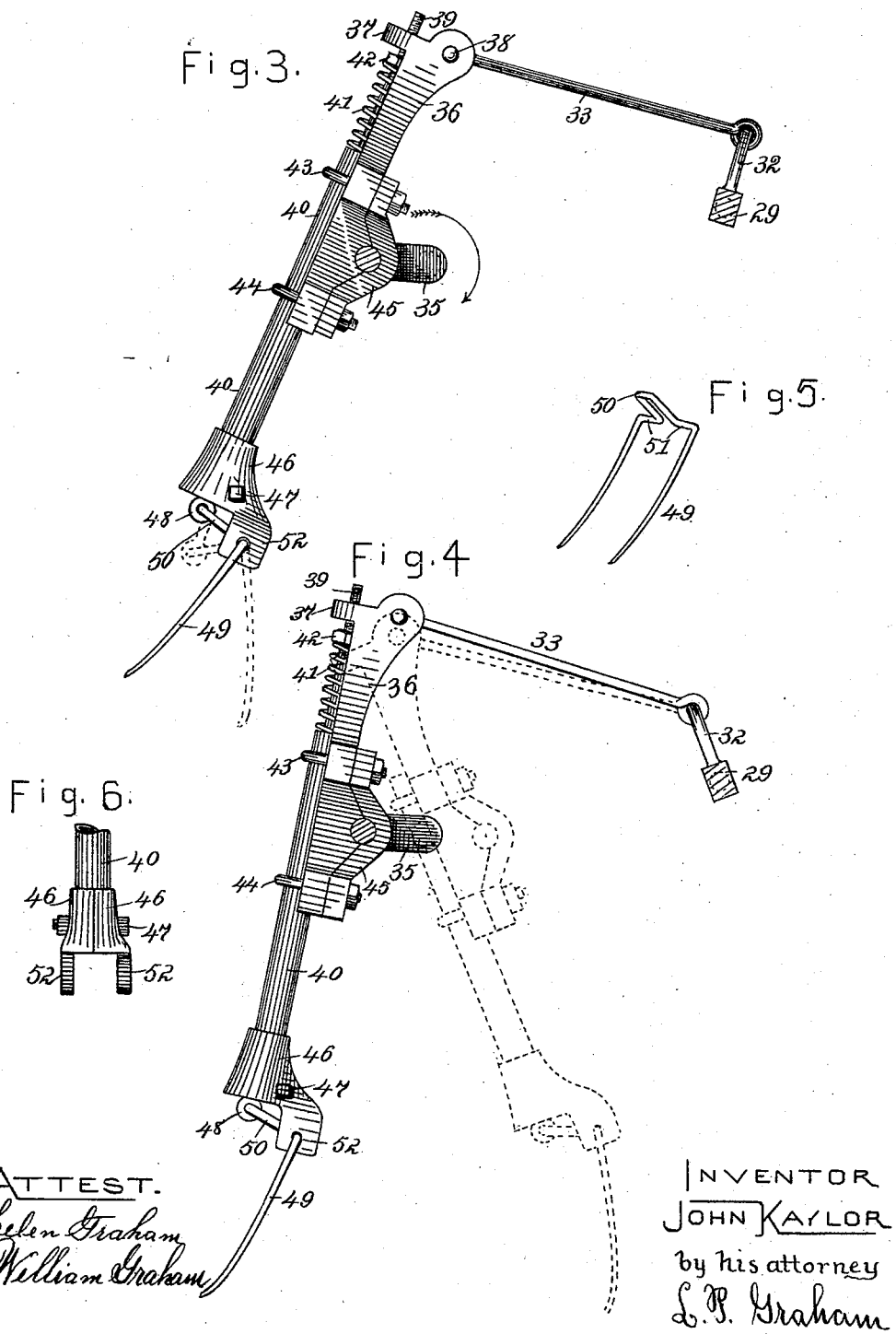

(No Model.) 3 Sheets—Sheet 3.
J. KAYLOR.
HAY TEDDER.
No. 496,612. Patented May 2, 1893.
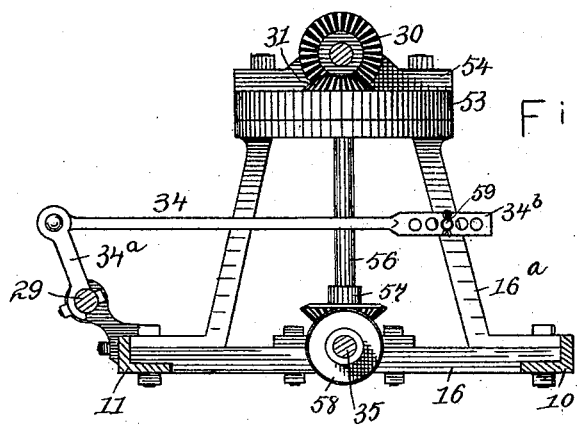
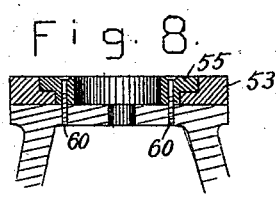
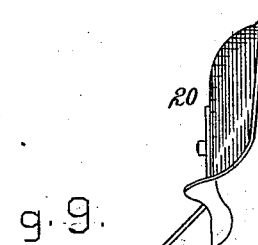
ATTEST
Helen Graham
William Graham
INVENTOR
JOHN KAYLOR
by his attorney
L. P. Graham

UNITED STATES PATENT OFFICE.

JOHN KAYLOR, OF DECATUR, ILLINOIS.

HAY-TEDDER.

SPECIFICATION forming part of Letters Patent No. 496,612, dated May 2, 1893.

Application filed April 4, 1892. Serial No. 427,646. (No model.)

*To all whom it may concern:*

Be it known that I, JOHN KAYLOR, of Decatur, in the county of Macon and State of Illinois, have invented certain new and useful Improvements in Hay-Tedders, of which the following is a specification.

This invention relates to tedders in which the tedding forks have combined oscillatory and orbital motion, it is embodied in the structure hereinafter described, and it is particularly pointed out in the claims.

One object of the invention is to provide means for changing the path of oscillation of the forks, so that the hay may be pitched more or less upward, as different circumstances may require.

Another object is to provide for regulating the tension of the yielding tines of the forks.

A third object is to permit the forks to be arranged in line with the direction of travel, when on the road, so that the tines of the forks will be less liable to strike obstructions.

A fourth object is to enable the device to be used as a side delivery rake, and a fifth object is to improve certain details of the device, as will hereinafter appear.

Figure 1:
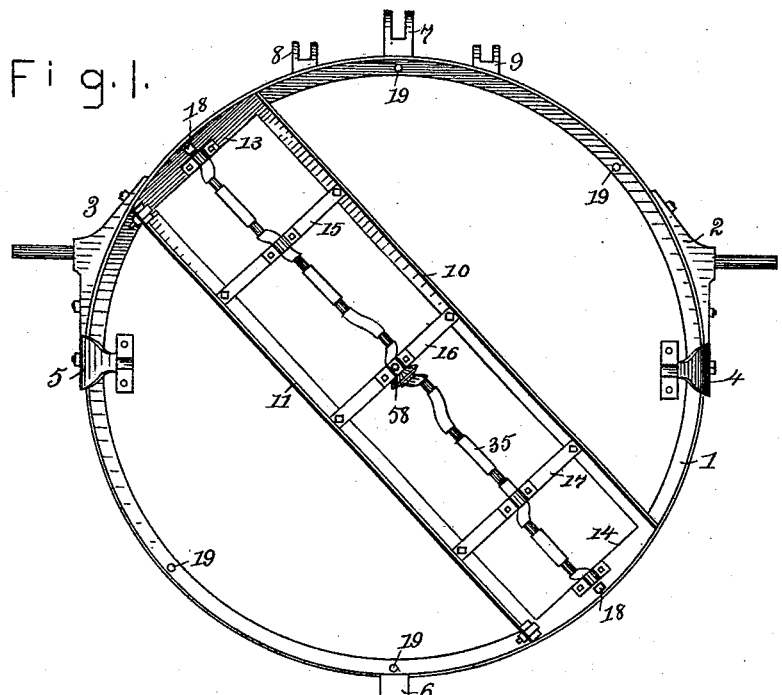
Figure 2:
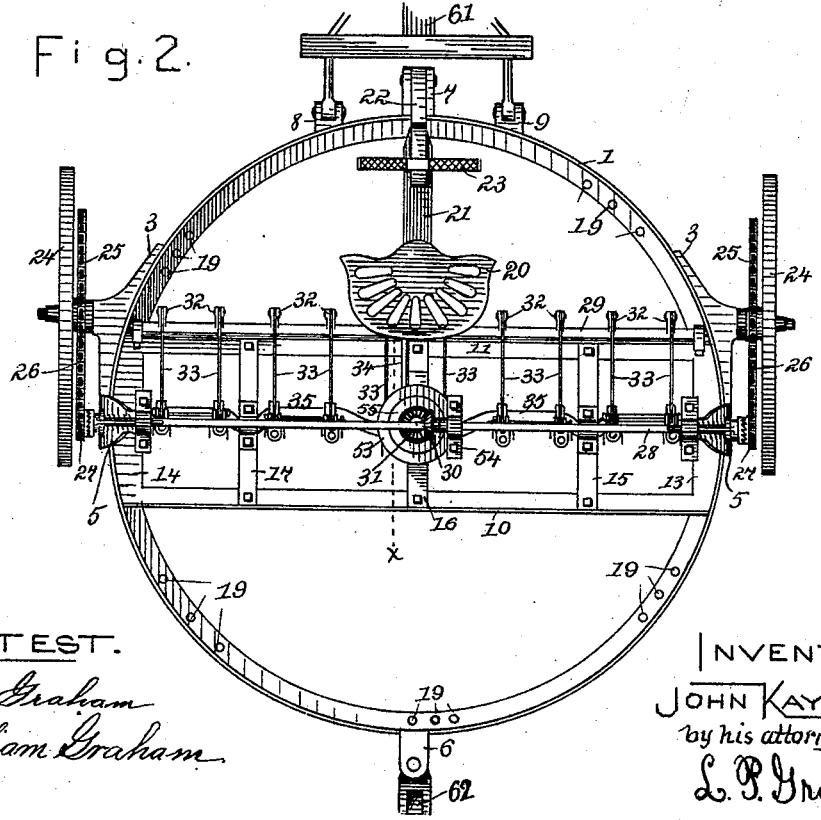

In the drawings forming part of this specification, Figure 1 is a plan of a carrying frame and a tedder frame, the latter being in the position it occupies when the device is used as a side delivery rake. Fig. 2 is a plan of the complete device in position to act as a tedder. Fig. 3 is a side elevation of a fork set to pitch the hay well upward. Fig. 4 is a similar view of a fork set to pitch the hay in a more nearly horizontal direction. Fig. 5 is a perspective representation of the tines of a fork. Fig. 6 is a face view of a fork stock. Fig. 7 is a section on line X in Fig. 2, showing details of the central gear, and also showing the means employed to regulate the throw of the forks. Fig. 8 is a central vertical section through the upper end of the gear supporting bracket shown in Fig. 7. Fig. 9 is a detail, showing the manner in which the seat is connected with the carrying frame, and also indicating how it may be swung aside to permit the tedder frame to be moved freely on the carrying frame.
The frame 1 forms a circular track on which the tedder frame may be turned, and it is consequently annular in plan outline, and preferably L-shaped in cross section. It is shown continuous in the drawings, but in practice it is better, or at least easier, to make it of sections suitably secured together. It is provided with brackets 2, 3, 4, 5, 6, 7, 8 and 9 bolted or otherwise secured to its periphery. The brackets 2 and 3 carry spindles for the supporting wheels 24, the brackets 4 and 5 provide bearings for drive shaft 28, bracket 6 provides a vertical pivot for the standard of the caster wheel 62, bracket 7 supplies a pivotal connection for the seat bar, and 8 and 9 form connections for tongue 61.

The tedder frame is composed of side bars 10 and 11, end bars 13 and 14, and intermediate cross bars as 15, 16 and 17. The side bars are preferably L-shaped in cross section, and in practice it is easier to make the end pieces separate and secure them to the side pieces by bolts or their equivalent. The carrying frame 1 has holes 19, placed wherever desired, and the tedder frame has holes in its ends adapted to register with the holes 19. The tedder frame may be turned freely in the carrying frame to any desired position, and when properly adjusted bolts 18 are placed through the coinciding holes and used to bind the two frames securely together. The seat 20 is supported on the seat bar 21, such bar is secured at its lower end to casting 22, and the casting is pivotally connected with bracket 7 and adapted to rest on the inner surface of the annular carrying frame. A cross bar 23 secured to casting 22, provides a rest for the feet of the driver. Wheels 24 are provided with sprocket wheels 25, and link belts 26 connect such sprocket wheels with sprocket wheels 27 on drive shaft 28. Gear wheel 30 on shaft 28 90 meshes with wheel 31 on vertical shaft 56, and wheel 57 on the lower end of shaft 56 meshes with wheel 58 on crank shaft 35. The lower end of shaft 56 has a bearing in a boxing of the crank shaft on central cross bar 16, and its upper end journals in bracket 16ᵃ which is supported by the cross bar 16. A circular groove is formed around the upper end of the bracket, either directly in the bracket or by means of a separate plate as 55, in Fig. 8, which is undercut to form the groove, and is secured to the top of the bracket by means of bolts 60, or in any other suitable manner. Collar 53 fits the groove of the bracket, it also provides a bearing 54 for the drive shaft and its function is to hold wheels 30 and 31 in mesh while permitting free adjustment of the tedder frame. Shaft 35 has numerous cranks extending in different radial directions, and on such cranks are mounted the tedder forks. Each fork has two tines and such tines are made each pair of a single piece of metal 49, bent at 51 to form bearing shoulders, and also bent at 50 to form a bent lever. The shoulders 51 journal in lugs 52 of stock 46, and the stock is make of two parts secured together and to the tubular shank 40 by means of bolt 47. Head 36 is concaved in one face to receive the upper end of the tubular shank, and such shank is secured to the head by means of the U bolts 43 and 44. Rod 39 connects by means of eye 48 with the lever extension 50 of the tines. It extends through the shank and through a hole in lip 37 of head 36, and it is threaded at its upper end and provided with nut 42. A spring 41 rests between the upper end of the shank and the nut, it tends to hold the tines in operative position, and its tension may be varied by screwing the nut up or down. A strap 45 secures the head to the crank shaft, such strap being bolted to the head 36 as shown.

Rock shaft 29 is carried by the tedder frame, and such shaft has arms, studs, or extensions 32, more or less vertical. Rods 33 connect the arms with pivots 38 in the heads of the forks. In addition to arms 32 the rock shaft has an arm 34ª, as seen in Fig. 7. Rod 34 connects pivotally with arm 34ª, and it has a flattened end 34ᵇ provided with a set of holes. A pin 59 on brackets 16ª, or some other convenient part of the tedder frame is adapted to the holes of the rod and forms a point of connection for the same as shown. The points 38 form movable pivots on which the fork shanks oscillate while the tines are describing orbits through the influence of the crank shaft, and when these points are changed the paths of oscillation will be correspondingly varied. This is exemplified in Figs. 3 and 4, and the result is attained by the simple expedient of placing different holes of rod 34 over pin 59. The adjustment of the rock shaft with its correspondent action on the forks, provides for different effects in the distribution of the hay, and it may also be used to give the tines extra elevation previous to going on the road.

The tines may be made stiff enough to insure sufficient strength and durability and still yield readily to immovable obstructions. This result is attained by the use of spring 41 which provides the necessary elasticity with the additional advantage that the tension of the elasticity may be varied.

When it is desired to use the device as a side delivery rake, the bolts 18 are removed, the seat is raised as indicated in Fig. 9 and the tedder frame is turned to the position shown in Fig. 1, where it is secured by the bolts as before. The same method is adopted to prepare the tedder to go on the road, except that the tedder frame is placed lengthwise of the carrying frame.

In converting the tedder into a rake the gearing may be slowed up with advantage, and this can be easily done by substituting larger sprocket wheels for wheels 27.

The sprocket wheels are mounted on the drive shaft in such manner that the shaft responds to the forward motion of the machine but is unaffected by backward motion. Clutches may also be used to disconnect the gear when on the road, but I claim no novelty in such devices, which are in common use in a variety of forms.

The rock shaft is parallel with the crank shaft, so that it may act effectively on the forks. The drive shaft is well above the carrying frame in order that it may clear the forks, and the vertical intermediate shaft is in the center of the frames in order that the tedder may be actuated in any of its possible positions.

I claim—

1. In tedders, the combination of an annular carrying frame mounted on wheels, a tedder frame traversing the carrying frame diametrically and having rotative adjustment thereon, a crank shaft in the tedder frame carrying tedding forks, a drive shaft geared to a carrying wheel or wheels and extended transversely across the carrying frame above the tedder, and gearing at the center of the frames connecting the crank shaft with the drive shaft.

2. In tedders, the combination of an annular carrying frame mounted on wheels, a tedder frame traversing the carrying frame diametrically and having rotative adjustment thereon, the drive shaft, the crank shaft, and the intermediate vertical shaft at the center of the tedder, the intermediate shaft connecting the drive shaft with the crank shaft by means of bevel gear.

3. In tedders, the combination of an annular carrying frame mounted on wheels, a tedder frame traversing the carrying frame diametrically and having rotative adjustment thereon, the crank shaft in the tedder frame, the drive shaft on the carrying frame, the vertical shaft connecting the drive shaft with the crank shaft, the bracket on the tedder frame providing a bearing for the upper end of the vertical shaft, and the collar on the bracket providing a bearing for the drive shaft.

4. A tedder fork comprising a tubular shank, tines pivotally connected with the lower end of the shank and having a lever extension, a rod extended through the tubular shank and connected with the lever extension of the tines, and a spring tending to press the rod upward.

5. A tedder fork consisting in the combination of a tubular shank, a two part stock attached to the lower end of the shank, tines pivoted in the stock and having a central lever extension, a rod connecting with the lever extension of the tines and extended through the tubular shaft, a nut screwed onto the upper end of the rod, and a spring between the nut and the upper end of the shank.

6. In a tedder in which a tedder frame has rotary adjustment in an annular carrying frame, a seat support on the carrying frame resting ordinarily in the path of adjustment of the tedder frame and pivoted to be swung out of such path.

In testimony whereof I sign my name in the presence of two subscribing witnesses.

JOHN KAYLOR.

Attest:
ABBOTT M. REEVES,
PARKE HAMMER.